A. L. DE LEEUW.
EMERGENCY CLUTCH.
APPLICATION FILED OCT. 4, 1909.

1,035,547.

Patented Aug. 13, 1912.

Witnesses

Inventor
Adolph L. De Leeuw
By
Attorneys

UNITED STATES PATENT OFFICE.

ADOLPH L. DE LEEUW, OF HAMILTON, OHIO, ASSIGNOR TO THE CINCINNATI MILLING MACHINE COMPANY, OF CINCINNATI, OHIO, A CORPORATION OF OHIO.

EMERGENCY-CLUTCH.

1,035,547.  Specification of Letters Patent.  Patented Aug. 13, 1912.

Application filed October 4, 1909. Serial No. 520,815.

*To all whom it may concern:*

Be it known that I, ADOLPH L. DE LEEUW, a citizen of the United States, residing at Hamilton, in the county of Butler and State of Ohio, have invented certain new and useful Improvements in Emergency-Clutches, of which the following is a specification.

My invention relates to a safety contrivance, primarily useful in connection with machine-tools.

The object of my invention is to provide in combination with the motion transmission elements, a normally engaging clutch, disconnected under abnormal conditions, and with means for regulating the resistance of the clutch with relation to the resistance of the work. This permits the clutch to be set to produce a predetermined maximum work capacity for the tool, so that when this strain is exceeded from any cause, the clutch will be automatically disengaged and the machine effectually insured against possible injury, resulting from accidents or from the application of any excessive strain.
This clutch is positive in character for all normal use of the machine, but becomes friction in character upon the application of abnormal strains.

The clutch engaging elements are formed with a view to substantially instantaneous disengagement, when the strain exceeds a predetermined degree, as a continued movement of the work-holding member, after the application of the excessive strain, would be disastrous.

Figure 1:
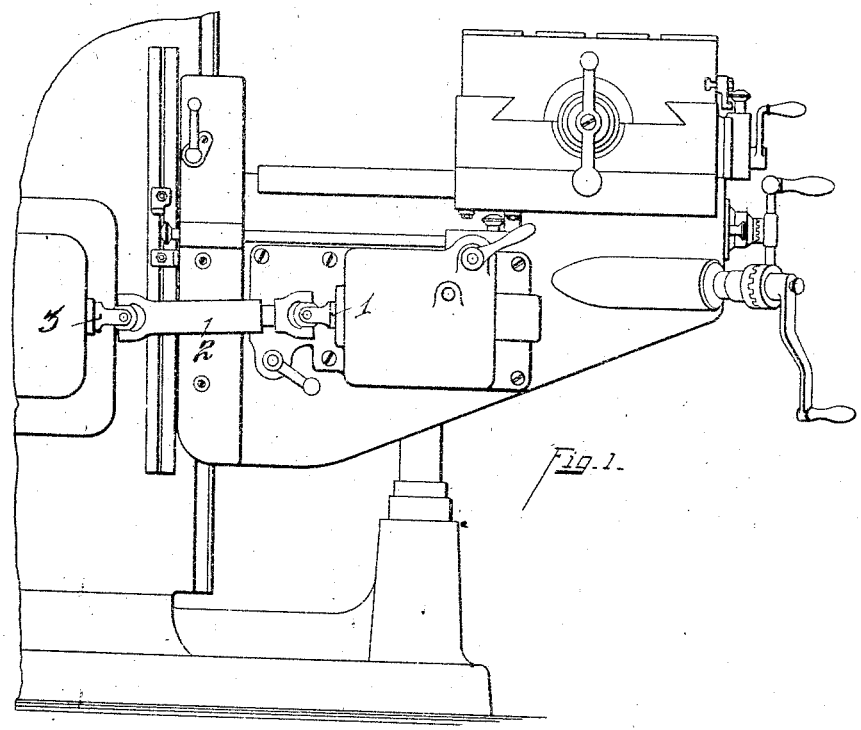
Figure 2:
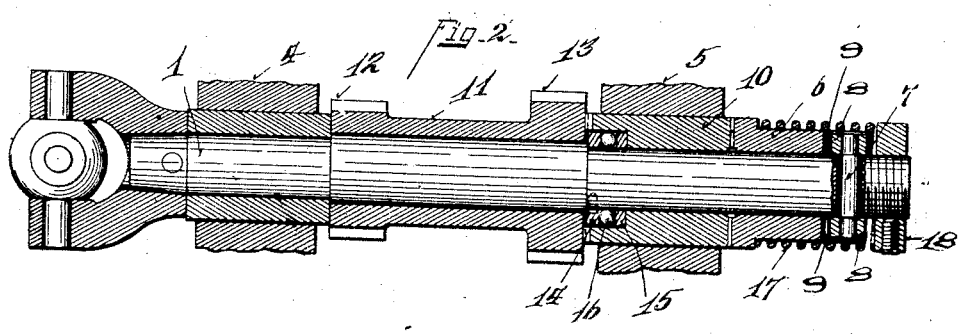
Figure 3:
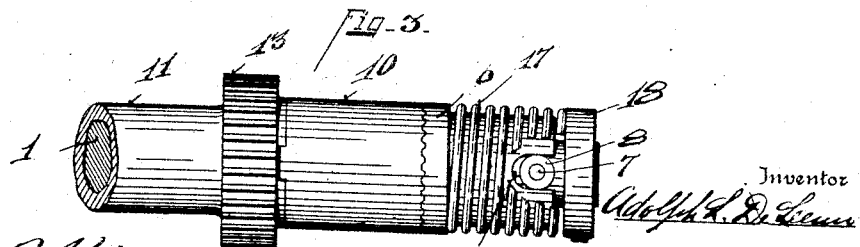

The features of the invention are more fully set forth in the description of the accompanying drawings, forming a part of this specification, in which:—
Figure 1 is a side elevation of the milling machine, containing my improvement. Fig. 2 is an enlarged section on line $x$, $x$, Fig. 1. Fig. 3 is an elevation of the emergency clutch shown in the section Fig. 2.
As illustrated in the drawings, I have shown my improvement as applied to the feed for the carriage and knee of a milling machine, but it is obvious that the same is applicable to various uses employing the rotary driving means in which it is desirable to automatically cut off the power when undue strain or resistance is brought upon the driven element.

1 represents the driving shaft, and, as illustrated, applied to a milling machine, provided with universal connections through the intermediate driving shaft section 2 with the shaft 3 journaled in the main frame of the machine. This being a common construction employed in transmitting power from the main frame of the machine to the vertically movable knee. The shaft 1 is journaled in bearings 4, 5.

6 represents a sleeve clutch member in connection with the driving shaft by means of a pin 7 passing through a bore formed in said shaft, said pin being preferably of slightly smaller diameter than the diameter of the bore.

8 represent rollers on the protruding ends of the pin 7, each of which project into a notch 9 formed in the clutch member 6, affording free sliding movement of the clutch member 6 upon the shaft 1, and forming a driving connection between said members, eliminating as far as possible frictional or binding strain, and affording a very free movement to the sleeve.

10 represents a sleeve clutch member, one end of which is provided with shallow tapered clutch-teeth of fine pitch, adapted to normally engage with the similar clutch-teeth on the clutch member 6.

11 represents a sleeve loose on shaft 1 provided with the gears 12, and 13, formed integrally therewith, for transmitting motion to the various parts of the machine, and at varying speeds or otherwise, and the whole as a gear element is connected to the sleeve clutch member 10. This connection is of clutch tooth type, in which the sleeve 11 is provided with one or more sockets, adapted to receive the tooth or teeth 20.

14, 15 represent washer bearing rings, and 16 represent intermediate balls, seated within an offset formed in the bearing sleeve 10, and engaged therewith on one side, and against a shoulder formed on shaft 1 on the opposite side, providing means for eliminating friction caused by end thrusts between the shaft and sleeve 11. The tooth connection between the clutch sleeve 10 and gear-carrying sleeve 11 is preferable so as to permit all end thrusts to be brought upon the ball bearing between the clutch sleeve 10 and the shaft 1.

17 represents a spring, the one end of which bears against the shoulder formed on the sleeve clutch member 6, while the opposite end bears upon the collar 18 adjustably mounted upon the shaft 1, thus forming means for predetermining the limit of power which can be conveyed to the driven element, to maintain a normal connection between the two clutch members, and if undue resistance is brought upon said driven element beyond the expansive tension of the spring, the two clutch members will slip upon each other, discontinuing the motion of the driven element. This connection of drive is highly advantageous in machine tools of the type of milling machines, in that it prevents feeding the work to the tool under too harsh a cut, or feeding the work against a dead-stop, or subjecting the machine to severer strains than it was designed or built to withstand. The tension of the spring 17 may be adjusted to maintain the clutch member in driving connection under normal usage of the machine.

Having described my invention, I claim:—

In combination with a driving member, and a driven member of a machine tool, an emergency clutch interposed between said members comprising a first clutch member in connection with said driven member, a second clutch member in connection with said driving member, and longitudinally movable thereon, each clutch member having shallow tapered clutch teeth of fine pitch, adapted to normally engage with each other, means for maintaining a fixed limit of resistance against said second clutch member, and means for connecting said second clutch and driving members, comprising a pin loosely projected through the driving member each end thereof provided with an anti-friction roller, each engaging within a notch, formed in said second clutch member.

In testimony whereof, I have hereunto set my hand.

ADOLPH L. DE LEEUW.

Witnesses:
OLIVER B. KAISER,
EMMA SPENER.